(12) United States Patent
Tateishi et al.

(10) Patent No.: US 6,320,292 B1
(45) Date of Patent: Nov. 20, 2001

(54) ELECTRIC MOTOR ASSEMBLY

(75) Inventors: Shiro Tateishi, Fukui-ken; Tsuyoshi Konishi, Takefu; Hiroshi Nishimura, Shiga-ken, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/575,666

(22) Filed: Jun. 15, 2000

(30) Foreign Application Priority Data

Jun. 17, 1999 (JP) .................................... 11-170491

(51) Int. Cl.$^7$ ...................................................... H02K 5/00
(52) U.S. Cl. ................... 310/91; 310/89; 310/90
(58) Field of Search .................... 310/91, 90, 98, 310/43, 235, 40 MM, 89; 15/412, 376, 377

(56) References Cited

U.S. PATENT DOCUMENTS

| | | | |
|---|---|---|---|
| 3,745,393 | * 7/1973 | Sports | .................................. 310/239 |
| 3,931,662 | * 1/1976 | Nayfa et al. | ............................ 15/320 |
| 4,084,793 | 4/1978 | Gardiner . | |
| 4,384,386 | 5/1983 | Dorner et al. . | |
| 4,527,960 | * 7/1985 | Desisto | .................................. 417/368 |
| 4,976,003 | * 12/1990 | Williams | ................................. 15/372 |
| 5,027,469 | * 7/1991 | Toyoshima et al. | ................... 15/339 |
| 5,335,740 | * 8/1994 | Meyer et al. | ....................... 180/19.1 |
| 5,974,623 | * 11/1999 | Cummins et al. | ..................... 15/347 |

FOREIGN PATENT DOCUMENTS

| | | |
|---|---|---|
| 836775 | 6/1960 | (GB) . |
| 2096407 | 10/1982 | (GB) . |

* cited by examiner

*Primary Examiner*—Karl Tamai
*Assistant Examiner*—Thanh Lam
(74) *Attorney, Agent, or Firm*—Greenblum & Bernstein, P.L.C.

(57) ABSTRACT

An electric motor assembly includes a hollow cylindrical casing having a stator disposed inside and adjacent an inner periphery thereof. A rotor is positioned inside the stator and has an output shaft. A bracket made of a thermosetting resin is mounted in one end of the cylindrical casing with a driven member positioned externally of the cylindrical casing and drivingly coupled with the output shaft for rotation about the output shaft. A bearing is mounted externally on the bracket for rotatably supporting the driven member.

4 Claims, 3 Drawing Sheets

ELECTRIC MOTOR ASSEMBLY

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Prior Art

Hitherto, the agitator employed in a vacuum cleaner suction nozzle employs an electric motor disposed in a cylindrical agitator housing to reduce and compactize the agitator. The electric motor for the agitator includes a stator formed on an inner periphery of a metallic barrel and a rotor disposed inside the stator with the agitator housing enclosing the metallic barrel. The rotor is coupled with an output shaft for rotation together therewith, and a rotational output of the output shaft is transmitted through a reduction gear unit to a driven wheel that is drivingly engaged at its outer periphery with the agitator housing to drive the latter. According to the prior art, a bearing for rotatably supporting the agitator housing is mounted externally on an outer periphery of the cylindrical casing.

As discussed above, in the prior art electric motor assembly, the bearing for rotatably supporting the agitator housing has been mounted on the outer periphery of the metallic barrel. The metallic barrel is generally shaped and manufactured by the use of a press work and, accordingly, cannot be made to a highly accurate dimensional precision. The consequence is that a problem occurs that the bearing cannot be accurately fitted, resulting in a trouble in rotation of the agitator.

2. Field of the Invention

The present invention generally relates to an electric motor assembly and, more particularly, to an electric motor assembly of a type including an electric motor built in a driven member such as, for example, an agitator in a suction nozzle for a vacuum cleaner.

SUMMARY OF THE INVENTION

Accordingly, the present invention has been devised to substantially eliminate the above discussed problem inherent in the prior art electric motor assembly and is intended to provide assured support of the bearing to secure a reliable rotation of the driven member.

To accomplish this object, the present invention provides an electric motor assembly including a hollow cylindrical casing having a stator disposed inside and adjacent an inner periphery thereof, a rotor positioned inside the stator and having an output shaft, a bracket mounted in one end of the cylindrical casing, a driven member positioned externally of the cylindrical casing and drivingly coupled with the output shaft for rotation about the output shaft, and a bearing mounted externally on the bracket for rotatably supporting the driven member. The bracket employed therein is made of a thermosetting resin.

According to the present invention, the bracket can be manufactured to a highly accurate dimensional precision and therefore the bearing can be assuredly supported.

Preferably, the bracket has a bearing mounting portion of an outer diameter larger than the outer diameter of the cylindrical casing. The electric motor assembly embodying the present invention may also include a dust beating member disposed on the outer periphery of the driven member to render it to be an agitator for a suction tool of a vacuum cleaner.

The bracket may have a brush carried thereby in sliding contact with a commutator integral with the rotor. This is particularly advantageous in that an electric insulating property can be increased because of the bracket having been made of the thermosetting resin.

According to the present invention, since the bracket is made of a thermosetting resin, an accurate dimensional precision can be attained during molding thereof and, therefore, the bearing support can be assured.

Also, since the bearing mounting portion of the bracket has an outer diameter that is larger than the outer diameter of the cylindrical casing, the bearing can easily mounted on the bracket with the aid of the cylindrical casing serving as a guide therefor and the bracket itself can advantageously used for mounting of the commutator brush.

BRIEF DESCRIPTION OF THE DRAWINGS

The present invention will become readily understood from the following description of a preferred embodiment thereof made with reference to the accompanying drawings, in which like parts are designated by like reference numeral and in which.

DESCRIPTION OF THE EMBODIMENT

Figure 1:
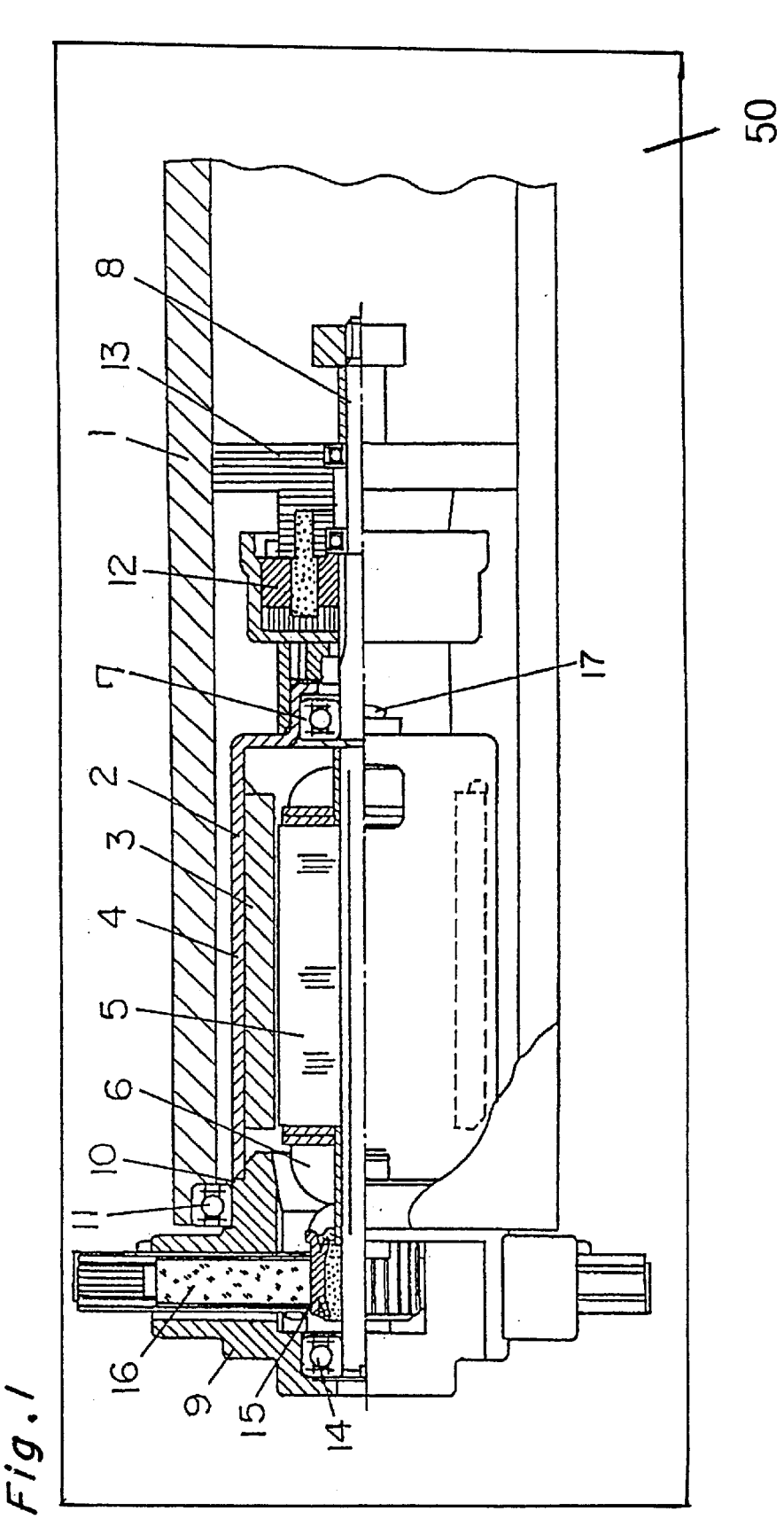
FIG. 1 is a fragmentary longitudinal sectional view of an electric motor assembly embodying the present invention.
Figure 2:
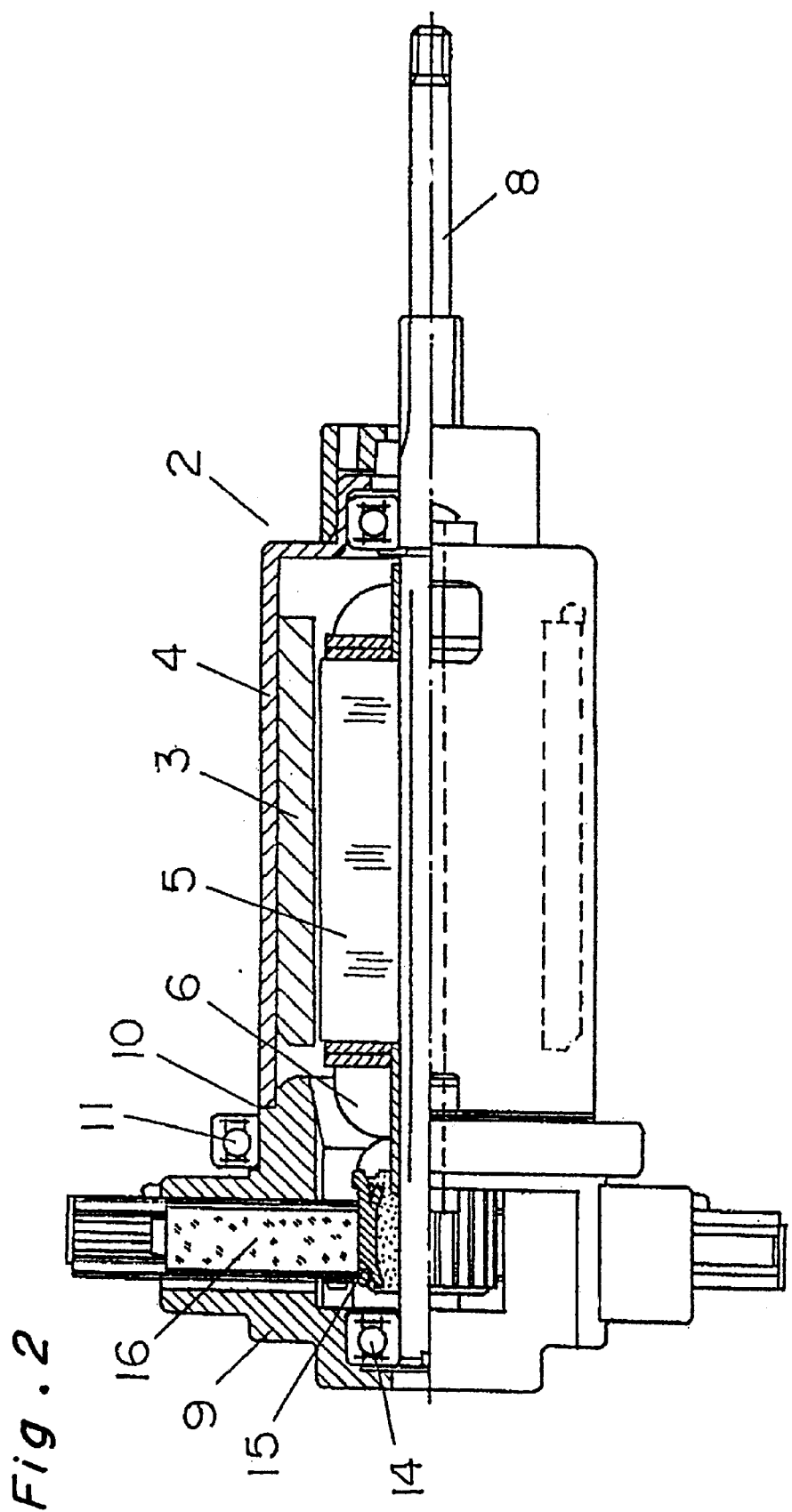
FIG. 2 is a longitudinal sectional view of the electric motor assembly with a driven member removed.
Figure 3:
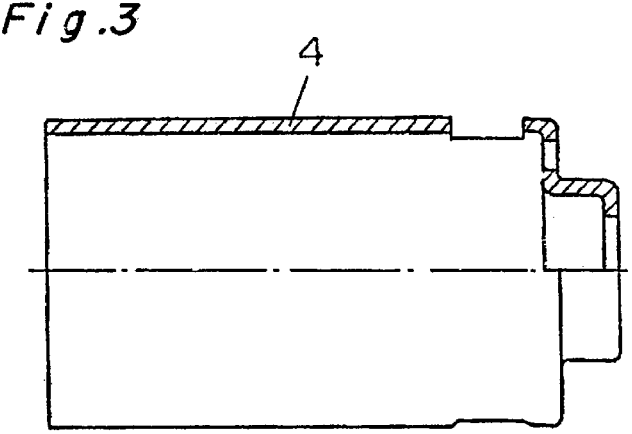
FIG. 3 is a fragmentary longitudinal sectional view of a hollow cylindrical body employed in the electric motor assembly.

Referring now to the accompanying drawings, particularly to FIGS. 1 to 3, shown therein, in schematic form, is an agitator of vacuum cleaner 50 for brushing a surface to be cleaned, for example, a carpet, comprises a beating member 23 and a floor brush mounted externally on a cylindrical driven member 1. This electric motor unit 2 comprises a cylindrical metallic casing 4 including a stator 3 in the form of a permanent magnet disposed inside and adjacent an inner periphery of the cylindrical casing 4, and a rotor 5 disposed rotatably inside the stator 3. The rotor 5 employed is of a standard type in which a winding 6 is formed around a core.

The cylindrical casing 4 has one end closed by an end wall and supporting a bearing 7 which may be a ball bearing. One end of an output shaft 8 integral with the rotor 5 is supported by this bearing 7. The opposite end of the cylindrical casing 4 is open to the outside and receives therein a bracket 9 that is made of a thermosetting resin. The bracket 9 has a portion formed with a cylindrical body 10 having a stepped portion that is snugly received within the open end of the cylindrical casing 4. It is to be noted that the outer diameter of the cylindrical body 10 of the bracket 9 having the stepped portion inserted into the open end of the cylindrical casing 4 is chosen to be slightly larger than the outer diameter of the cylindrical casing 4.

A bearing 11 such as a ball bearing is fixedly mounted externally on the cylindrical body 10 that supports the driven member 1 of the agitator through the bearing 11. The output shaft 8 is drivingly coupled through a reduction gear unit 12 with a drive wheel 13 having its outer periphery meshed with an inner peripheral surface of the driven member 1 of the agitator.

A bearing 14 such as a ball bearing for the support of one end of the output shaft 8 is fitted in the bracket 9, and a commutator 15 integral with the output shaft 8 is positioned within a cavity defined inside the bracket 9. Reference numeral 16 represents a brush held in sliding contact with the commutator 15. This brush 16 is carried by the bracket 9 through a holder.

Figure 4:
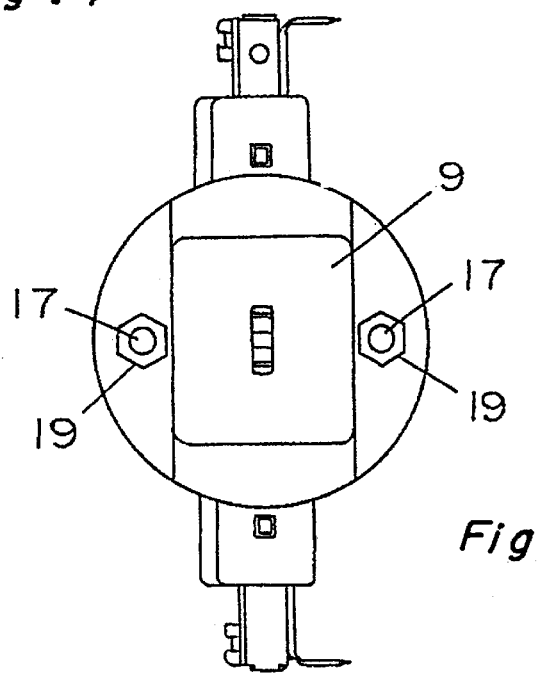
FIG. 4 is a side view of a drive transmitting device employed in the electric motor assembly.
Figure 5:
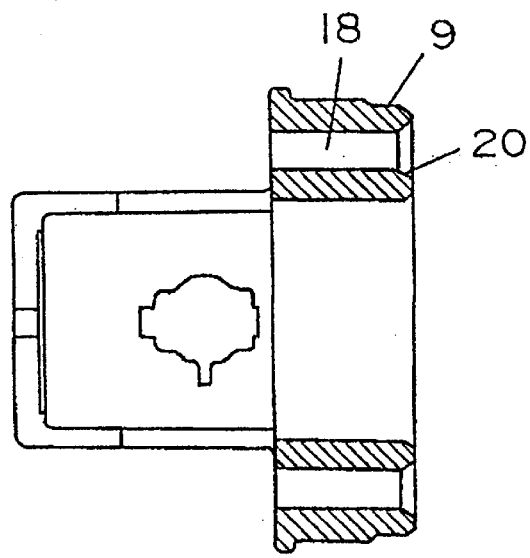
FIG. 5 is a longitudinal sectional view, on an enlarged scale, of a bracket employed in the electric motor assembly.

As best shown in FIGS. 1, 4 and 5, the cylindrical casing 4 and the bracket 9 are firmly integrated together by means of a plurality of bolts 17. More specifically, when the bolts 17 are inserted one by one externally through the end wall at the closed end of the cylindrical casing 4, a free end of each bolt 17 opposite to the head thereof passes through a corresponding hole 18, defined in the bracket 9, and a corresponding nut 19 is fastened to the free end of the respective bolt 17, as shown in FIG. 4, to thereby connect the cylindrical casing 4 firmly with the bracket 9. At this time, the head of each bolt 17 is positioned externally of the end plate of the cylindrical casing 4 as shown in FIG. 1. Each of the holes 18 defined in the bracket 9 for receiving the corresponding bolt 17 is tapered outwardly at one end adjacent the electric motor unit 2, so that the respective bolt 17 can easily be passed therethrough.

Assuming that an electric power is supplied to the electric motor unit 2, the rotor 5 rotates in one direction with a rotational drive force transmitted to the driven wheel 13 through the output shaft 8 by way of the reduction gear unit 12, causing the driven wheel 13 to rotate. Rotation of the driven wheel 13 is transmitted to the driven member 1, thereby driving the agitator. At this time, the driven member 1 smoothly rotate around the bearing 11 mounted externally on the cylindrical body 10 of the bracket 9.

Since the cylindrical body 10 of the bracket 9 on which the bearing 11 is mounted has an outer diameter that is slightly larger than the outer diameter of the cylindrical casing 4, the bearing 11 can be mounted onto the cylindrical body 10 merely by capping the cylindrical casing 4 onto and over the driven member 1 of the agitator having the bearing 11 mounted on one end thereof. Also, since the bracket 9 is made of the thermosetting resin and can therefore be molded to a highly accurate dimensional precision, the mounting of the bearing 11 can be assuredly attained.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

DEPOSIT OF COMPUTER PROGRAM LISTINGS

Not Applicable

What is claimed is:

1. An electric motor assembly which comprises a hollow cylindrical casing having a stator disposed inside and adjacent an inner periphery thereof, a rotor positioned inside the stator and having an output shaft, a bracket mounted in one end of the cylindrical casing and made of a thermosetting resin, a driven member positioned externally of the cylindrical casing and drivingly coupled with the output shaft for rotation about the output shaft, and a bearing mounted externally on the bracket for rotatably supporting the driven member.

2. The electric motor assembly as claimed in claim 1, wherein the bracket has a bearing mounting portion of an outer diameter larger than the outer diameter of the cylindrical casing.

3. The electric motor assembly as claimed in claim 1, further comprising a beating member of a vacuum cleaner disposed on an outer periphery of the driven member.

4. The electric motor assembly as claimed in claim 1, further comprising a brush carried by the bracket in sliding contact with a commutator integral with the rotor.

* * * * *